June 24, 1930.   O. A. LANGOS   1,767,802
TABLE COOKER
Filed Oct. 8, 1927
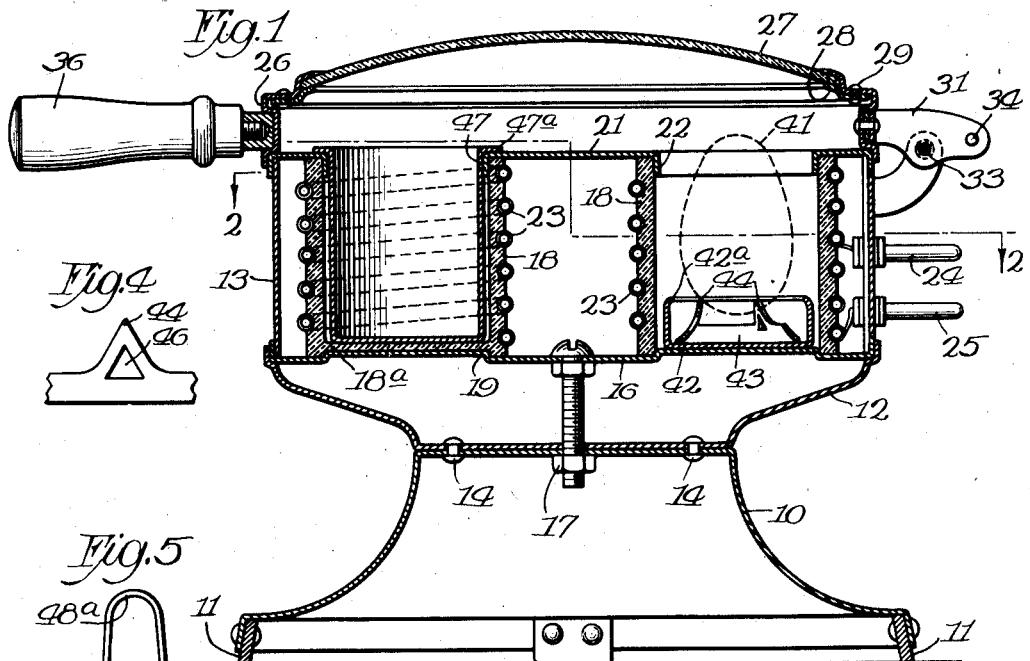
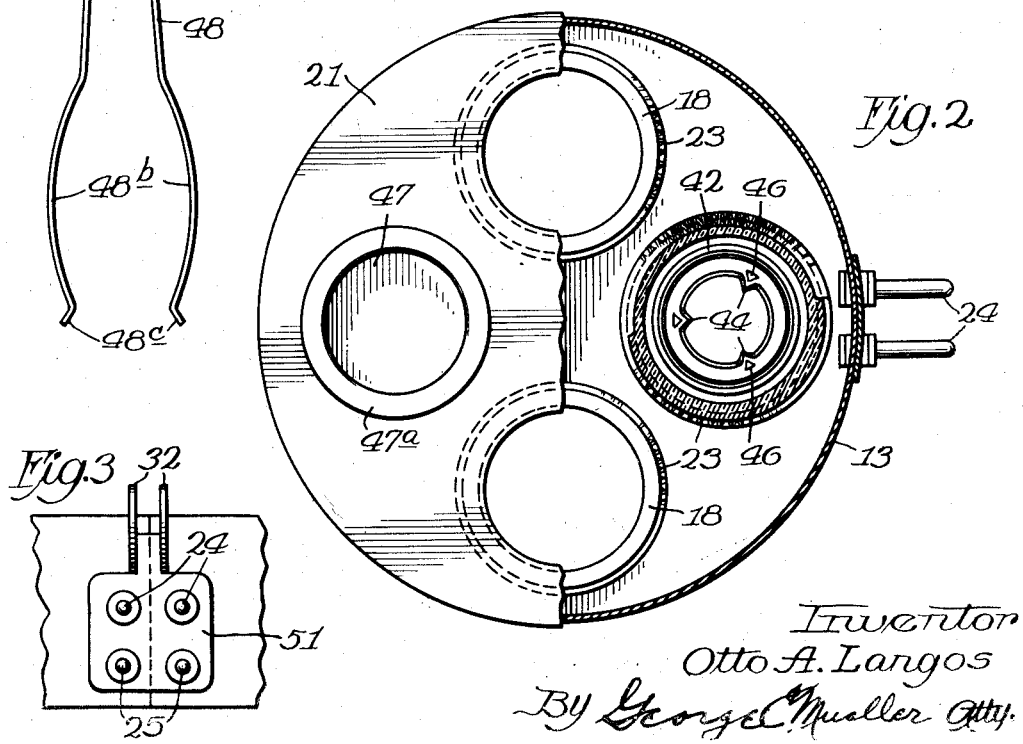
Inventor
Otto A. Langos
By George C. Mueller Atty.

Patented June 24, 1930

1,767,802

UNITED STATES PATENT OFFICE

OTTO A. LANGOS, OF CHICAGO, ILLINOIS

TABLE COOKER

Application filed October 8, 1927. Serial No. 224,782.

My invention relates to table cookers and has for its main object the provision of a portable cooker by means of which eggs and other small objects may be cooked at the table.

The cooker is of the type generally referred to as a waterless egg cooker, in that the egg is adapted to be cooked without water. I have provided a novel device, however, by means of which other small articles may be heated or baked with practical results.

The details of the invention will be understood by consideration of the following description taken with the accompanying drawings, wherein Fig. 1 is a vertical sectional view through the center of a cooker embodying the main features of my invention, and showing certain attachments adapted to be used therewith;

Fig. 2 is an irregular section taken along the line 2—2 of Fig. 1;

Fig. 3 is a fragmentary view showing a structural detail;

Fig. 4 is a fragmentary view of an egg support, and

Fig. 5 is an elevational view of a tool adapted to be used with the cooker.

The heater comprises a base 10 with feet 11 preferably made of fiber or similar material, an outflared portion 12 and a casing or housing 13 into which the heating elements and individual cooking chambers are adapted to be contained. The base 10 and outflared portion 12 are both substantially bell shape but reversed from each other so that their transverse portions are held together by suitable rivets 14—14. The casing has a bottom 16 suitably attached to the side, and is secured to the base by a nut and bolt 17.

Within the casing there are arranged a plurality of porcelain cups 18 of cylindrical shape and adapted to be positioned with respect to the casing by means of circular relief portions 19 formed from the bottom 16. In this form the relief portion of the bottom serves as the bottom of the cup or heating shoulder, but an integral porcelain partition 18ª may be provided if desired, to produce a full porcelain cup. The cylindrical porcelain cups 18 are engaged by a top plate 21 which is recessed and provided with downwardly extending flanges 22 engaging on the inside of the cups in the manner shown.

This top plate is also secured to the casing 13 in any suitable manner. It may be simply clamped in place which is desirable from one point of view because it prevents all possibility of tampering with the heating elements and the like; and this construction is also advantageous because it is economically produced. I also anticipate providing a readily detachable top plate so that access to the heating elements for the purpose of changing them may be easily had. Both of these constructions can be had in ways well known in the art and it is not considered necessary to describe them in detail.

Various ways may be employed for arranging the heating elements with respect to the individual cooking chambers but I have developed a form by means of which I obtain very good results. The outside of the porcelain cups 18 is provided with convolute grooves for receiving helically wound resistance wire 23 which constitutes the heating element. The arrangement is such that the porcelain not only serves as the cooking cup but also serves as a portion of the heating element itself.

The cooker is arranged so that the temperature in the chambers thereof may be modified depending upon the article to be cooked. In this connection, I provide two pair of terminals 24—24 and 25—25 which are connected to a suitable source of current supply for the production of either low or high temperature. This gives two heats but others may be supplied or any other heat regulating means provided if desired. I prefer this arrangement, however, because it is simple and fool-proof. If articles such as eggs are to be cooked, the low temperature is employed. If other articles are to be cooked for example, small biscuits or cakes, the high temperature may be employed.

A cover is supplied for the cooker, including an annular band 26 with a glass top 27 secured between a peripheral flange on the band and an annular clamping member 28, this clamping member being secured to the band by rivets 29. A hinge member 31 is riveted to one side of the band and extends between ears 32—32 carried by the casing, a pivot pin 33 extending through the ears and hinge member 31 to secure the cover to the casing in hinged relation. A stop pin 34 is suitably secured in the front end of the hinge member 31 so as to project on both sides thereof and engage against the bottom arcuate edge of the ears 32 to limit the opening of the cover and to support the cover in upright position when open. A handle 36 is secured to the band of the cover opposite the hinge.

Articles of food may be cooked within the porcelain cups 18 without the provision of any other container. I provide a number of cooking "utensils" or pans for use with the cups, however, the pans varying in design depending upon the articles to be cooked.

When an egg 41 is to be cooked, a shallow pan 42 is dropped into the bottom of the cooking chamber and a stand 43 placed therein in the manner shown. This stand is provided with three upstanding points 44 upon which the egg is adapted to rest. These points result in only a minimum surface engagement between the egg and the cooker and avoid all possibility of the egg being browned in spots or being cooked unevenly. To further limit the possibility of the relative high heat conducting metal, causing too great a transfer of heat to the surface of the egg, a triangular opening 42 is provided in each one of the projections 44 so that the amount of metal is considerably less than that which would be required to conduct sufficient heating directly to the surface of the egg to deleteriously affect it.

In addition to the minimum surface contact of the egg, the shallow pan has the function of catching any egg matter which might flow should the egg crack during the cooking operation. This pan is removable from the heating chamber for the purpose of cleaning or when another type of pan is to be used for cooking or baking another food article.

When other articles are to be cooked besides eggs, a deep pan 47 may be used instead of the shallow pan and this pan is adapted to be held within the porcelain cup in the manner shown. It has a top flange 47$^a$ resting against the top of the plate 21 which serves to retain the pan in position. This flange is easily grasped for removing the pan when it is to be changed for another type of pan.

A tool 48 shown in Fig. 5 is provided for use with the cooker. It has two legs with an integral spring connection 48$^a$ and arcuate sides 48$^b$ which are shaped so as to fit the side edges of an egg or similar object. The ends of the legs are provided with offset feet 48$^c$ which are adapted to engage under the inwardly extending flange 42$^a$ of the shallow pan for removing the pan and stand when another type of utensil attachment is to be used in the porcelain cup. The legs of the tool are "distended" sufficiently so that they may be screwed together to grip the egg, but allowed to slide so as to engage the feet under the flange 42$^a$ when the pan is to be removed.

In the construction of the casing 13, I provide a plate 51 from which the ears 32 are adapted to project as integral portions thereof. The terminals 24 and 25 are arranged so that they secure the casing 13 to the plate 51. In this way, the plate 51 serves to fasten together the two ends of the strip making up the casing, and to reinforce the casing at this point sufficiently to maintain the ears and switch terminals in firm position without possibility of injury to the casing. This construction aids materially in the production of a light efficient cooker adapted for table use.

My cooker in practical use, is a big improvement over other waterless egg cookers heretofore known. An egg can be cooked in a dry heat without the presence of any brown markings on the shell such as would normally result from the contact between the egg and a metal supporting structure. The cooker is easily cleaned if by any chance an egg shell should be broken so as to permit the white of the egg to run downwardly into the bottom of the cooking chamber.

The cup 47 can be used for baking small biscuits or cakes or it can be filled with water or milk for the purpose of poaching an egg therein. It can also be coated with butter and the egg submitted to a frying operation, or it may be filled with water and the egg boiled in the usual way. By partly filling the heating chambers with water, articles contained therein may be steamed. These and other cooking operations may be accomplished in a practical convenient way at the breakfast table by the use of my equipment.

Although I have described specific forms of the invention in order that the details thereof may be clear to those skilled in the art, I do not restrict myself to the particular form shown and the invention is limited only by the scope of the appended claims.

What I claim as new and desire to secure by United States Letters Patent is:

1. A table cooker adapted to cook eggs without water, said cooker including a casing, an electric heating element within the casing, a removable pan, and an egg holder within the pan having pointed upward extensions on which the egg is adapted to rest during the cooking operation.

2. A table cooker adapted to cook eggs without water, said cooker including a casing, an electric heating element within the casing, a shallow removable pan adjacent the heating element, and an egg supporting base within the pan having upwardly extending pointed projections on which the egg is adapted to be supported during the cooking operation.

3. In a table cooker adapted for baking eggs, a casing, a cup within the casing in which an article is adapted to be cooked, heating means within the casing and surrounding said cup, and means forming a plurality of points on which to support an egg during baking thereof.

4. A table cooker comprising a casing having a bottom, a raised portion formed in said bottom, a cylindrical heater resting on said bottom and positioned by said raised portion, a top plate secured to the casing and having a flange extending into said cylindrical heater, the space between the casing and the cylindrical walls of the heater being enclosed to heat insulate the heater.

5. A table cooker comprising a casing having a bottom plate, a plurality of heaters positioned thereon, a top plate for securing the heaters in position, the casing together with the top and bottom plates forming enclosed heat insulating spaces around the heaters, and an enclosed heat insulating space underneath the bottom plate.

In witness whereof, I hereunto subscribe my name this 17th day of September, 1927.

OTTO A. LANGOS.